Dec. 8, 1936.  C. R. SODERBERG  2,063,706
METHOD OF MANUFACTURING BLADES
Filed June 14, 1935
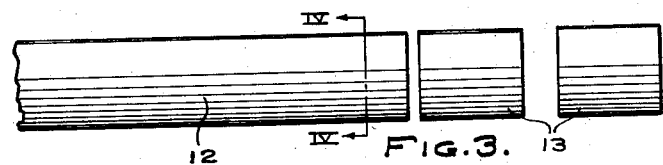
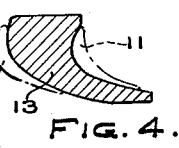
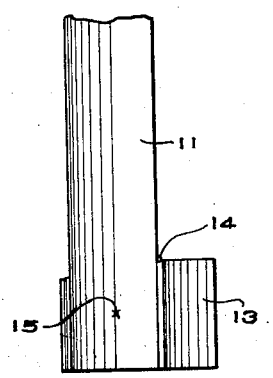
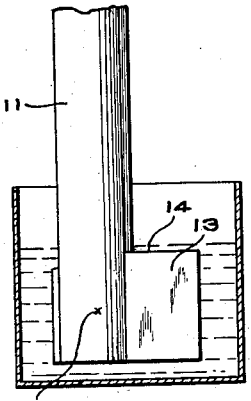
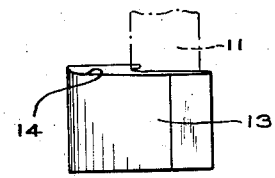
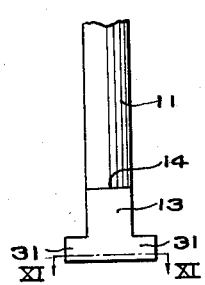
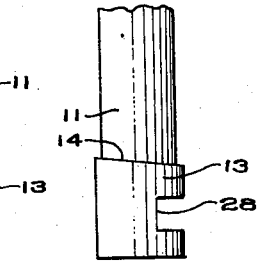
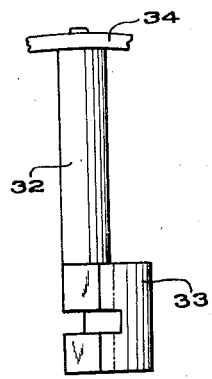
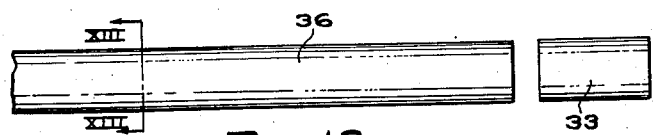
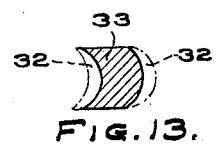
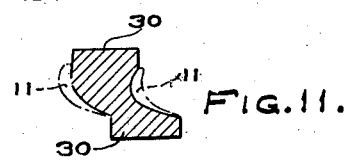
WITNESSES:
James K. Mosser
E. Lutz
INVENTOR
CARL R. SODERBERG.
BY
a. B. Reavis
ATTORNEY Patented Dec. 8, 1936

2,063,706

UNITED STATES PATENT OFFICE 2,063,706

METHOD OF MANUFACTURING BLADES

Carl R. Soderberg, Swarthmore, Pa., assignor to Westinghouse Electric & Manufacturing Company, East Pittsburgh, Pa., a corporation of Pennsylvania Application June 14, 1935, Serial No. 26,575

6 Claims. (Cl. 29—156.8)

My invention relates to an improved process of manufacture of turbine blades or vanes and it has for an object to provide for manufacture of blading, wherein each blade comprises unitary blade and spacing or packing piece elements, from bar stock of suitable cross-sections cut to the required lengths or heights, the lengths or heights of the blade and packing piece sections being brought together in proper relation and autogenously connected.

In accordance with my invention, I provide for the manufacture of turbine blades or vanes from bar stock of suitable sections secured by rolling, drawing or machining. The stock is sectioned into suitable lengths to provide for blade and packing or spacing piece elements, the section of the spacing or packing piece stock being so shaped that the one convex face thereof is conjugate to the concave face of a blade element and the concave face thereof is conjugate to the convex face of an adjacent blade when the blades are assembled. The blade and packing piece elements are brought into proper relation to provide a blade assembly; and, while being held in assembled relation, as by means of tack-welding, the elements are brazed together. If desired, the top surface of the root packing piece element may be machined before attachment to the blade element so as to conform to the desired steam passage of a turbine. After a blade element and a packing piece element are autogenously connected together to form a composite blade root portion, such root portion is machined so as to provide a desired fastening feature for holding the blade in place with respect either to turbine stator or rotor structure. A further object, therefore, of my invention is to provide an improved method or process of turbine blade manufacture involving the foregoing steps for the purpose of making it possible to produce blades of desired materials very economically.

These and other objects are effected by my invention, as will be apparent from the following description and claims taken in connection with the accompanying drawing, forming a part of this application, in which:

Fig. 1 is a diagrammatic view showing blade stock and sections thereof;

Fig. 2 is a sectional view taken along the line II—II of Fig. 1;

Fig. 3 is a diagrammatic view showing spacing or packing piece stock and sections thereof;

Fig. 4 is a sectional view taken along the line IV—IV of Fig. 3;

Fig. 5 is a detail view showing a spacing or packing piece element with the upper surface thereof machined;

Fig. 6 is a detail view showing tack-welds between connected blading and spacing or packing piece elements;

Fig. 7 is a diagrammatic view illustrating the brazing operation;

Figs. 8, 9, and 10 show different types of root constructions;

Fig. 11 shows a further modified form of packing piece taken, for example, along the line XI—XI of Fig. 10; and, Figs. 12, 13, and 14 show the invention applied to a further form of turbine blading, Fig. 13 being a section taken along the line XIII—XIII of Fig. 12.

Referring now to the drawing more in detail, in Fig. 1, I show blade stock 10 and sections 11 cut therefrom of length suitable for the desired blade height. The stock 10 is readily procurable, rolled, drawn or machined to the section shown in Fig. 2. In like manner, the spacing or packing piece stock 12 is sectioned to provide spacing or packing piece elements 13, it being apparent from Fig. 4 that such spacing or packing piece stock is readily procurable in rolled, drawn or machined form.

As will hereinafter be pointed out, a blade element 11 and a spacing or packing piece element 13 are fastened to provide a blade wherein the spacing piece element and the adjacent portion of the blade element together constitute the root. Since the blade and spacing or packing piece elements are separately fabricated, it will be apparent, that the upper surface 14 of a spacing or packing piece element 13 may be machined or cut to conform to a desired turbine steam passage before the packing piece element is connected to its blade element.

The spacing or packing piece elements 13 are connected to the blade elements 11, to provide blade root portions, preferably by brazing, but, in order that these parts may be brazed together, it is necessary that they be held in proper relative position by some means. Accordingly, before brazing, I preferably bring a spacing or packing piece 13 into proper relative position with respect to a blade element 11 and then tack-weld the elements together, tack-welds being diagrammatically engaged at 15 in Figs. 6 and 7. I preferably bring the convex face of a blade element into engagement with the concave face of a packing element and then tack-weld the two together, the welding tool being easily brought into desired welding engagement with the concave face of the blade element.

After connection of a packing piece element and a blade element sufficient to hold the elements in proper relative position, and after cleaning or pickling, the root portion of the blade is dipped sufficiently into a brazing compound, as indicated in Fig. 7, in order that an autogenous connection or metallic bond may be formed in the capillary space between a face of the spacing or packing piece element and a blade element.

After dip brazing of the connected blade and packing piece elements to form the composite blade root portions, such root portions are cleaned and machined to remove surplus brazing compound and to provide for suitable blade root side and bottom surfaces as well as holding portions, the front surface of a composite blade root conforming to the back surface of the adjacent root, so that, with assembly of a plurality of blades, the root portions will nest together in series.

The composite blade root portion may be machined to provide any suitable type of holding connection. In Fig. 8, I show a composite blade root having a lateral recess 28 for fastening purposes, and, in Fig. 9, the root has opposed recesses 29 forming the conventional T-root. The arrangement so far described is particularly suitable for the larger type of blades in that fastening portions of the composite blade root include parts both of the packing piece element and of the blade element.

In Figs. 10 and 11, I show an arrangement wherein the spacing packing piece elements are wider than the blade elements, the packing piece elements having lateral portions 30 extending beyond the edges of a blade element. After brazing, the laterally-extending portions 30 are machined to provide for suitable fastening tongue elements 31. As may be seen from Fig. 11, due to the fact that the blade element width is less than the width of a packing piece element, the section of a packing piece element is somewhat more complicated; however, it is still of such relatively simple type that it may be readily rolled. The type of construction shown in Figs. 10 and 11 is particularly suitable for the smaller sizes of blades in that machining of the composite root portion to provide the holding features does not result in sections which are too small.

In Figs. 12, 13, and 14, I show my invention applied to impulse blading of the shrouded type, each blade comprising a blade element 32 joined to a root element 33, as shown in Figs. 13 and 14. As shown, the tip of the blade element is connected to a shroud 34. The blade elements 32 are formed from suitable rolled stock, the latter being sectioned in suitable lengths as heretofore pointed out. With respect to the spacing elements 33, these may be formed from suitable rolled stock 36, as shown in Fig. 12, the stock being sectioned to provide root packing elements 33.

After providing the blade elements 32 and the spacing elements 33 and 34, each blade element is brought into proper relation with respect to a pair of spacing elements to provide a blade; and, with the elements of the blade held in proper relation, as by tack-welding, brazing connections or metallic bonds are formed between the blade and spacing piece elements as heretofore pointed out.

After the spacing elements 33 and 34 are brazed to the blade element 32, the blade is subjected to the necessary machining operations to care for the tapered spaces between blades as well as the root fastening.

From the foregoing, it will be apparent that I have devised a process of blade manufacture which results in substantial economy of production. Heretofore, to provide a blade with an integral root portion, it has been necessary either to machine the blade from bar stock so as to provide for the blade and root portions or to dropforge the blade from suitable stock, the forging being later machined to provide the desired surfaces and the root portion. By the use of my invention, these inherently relatively more expensive steps are largely avoided, for I merely use stock of two sections, one for the blade elements and one for the packing piece elements, each blade element being autogenously connected, as by brazing, to a packing piece element so that, in effect, an integral blade and root structure is provided. By producing a blade in this way, it will be apparent that the cost of manufacture may be greatly reduced because the steps involved are inherently economical and machining is reduced to a minimum. Furthermore, as compared to the process where a blade and its root portion are milled from steel stock, greater economy in the use of material results.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. The process of manufacturing individual turbine blades or vanes each having connected blade and spacing piece elements which comprises providing metallic blade element stock of suitable cross-section and metallic spacing piece element stock of section suitable to the blade element stock, sectioning the blade and spacing piece element stock to form blade and spacing piece elements of the required heights, bringing each blade element and its spacing piece element into proper assembled relation, connecting the assembled elements to provide a unit, and brazing together the elements of the unit to provide an individual blade.

2. The process of manufacturing individual turbine blades each having connected blade and spacing elements which comprises providing blade element stock of suitable section and spacing piece element stock of a section suitable to the blade element stock, sectioning the blade and spacing piece stock to form blade and spacing piece elements, bringing each blade element and spacing element into proper relation and forming an autogenous connection therebetween, whereby there is provided a unitary blade having a composite root portion formed of the spacing piece element and the adjacent portion of the blade element joined thereto, and in machining the composite root portion to provide a suitable fastening feature.

3. The process of manufacturing individual turbine blades each having connected blade and spacing elements which comprises providing blade element stock of suitable section and spacing piece element stock of a section suitable to the blade element stock, sectioning the blade and spacing piece element stock to form blade and spacing piece elements of suitable heights, bringing each blade and its spacing piece element into suitable relation and forming an autogenous connection therebetween to provide a blade having a unitary blade and spacing piece elements, said spacing piece elements being wider than the blade elements and extending outwardly from the latter at each side, and in machining the spacing piece elements beyond the blade element edges to provide a fastening.

4. The process of manufacturing individual turbine blades each having connected blade and spacing elements which comprises providing blade element stock of suitable section and spacing piece element stock of section suitable to the blade element stock, sectioning the blade and spacing piece element stock to form blade and spacing piece elements of suitable heights, bringing each blade element into proper relation with respect to a spacing piece element and forming an autogenous connection therebetween, whereby there is provided a unitary blade having a composite root portion formed of a spacing piece element and the adjacent portion of the blade element joined thereto, and in machining the composite root portion to provide a blade fastening constituted by material of the blade and packing piece elements.

5. The process of manufacturing individual turbine blades each having connected blade and spacing elements which comprises providing blade element stock of suitable section and spacing piece element stock of a section suitable to the blade element stock, sectioning the blade and spacing piece element stock to provide blade and spacing piece elements of suitable heights, bringing each blade element into proper relation with respect to a spacing piece element and tack-welding the blade element to the spacing piece element, and then brazing together the blade and spacing piece elements to form an individual blade.

6. The process of manufacturing individual turbine blades each having connected blade and spacing elements which comprises providing blade element stock of suitable section and spacing piece element stock of a section suitable to the blade element stock, sectioning the blade and spacing piece element stock to form blade and spacing piece elements of suitable heights, bringing each blade element and a spacing piece element into proper relation and tack-welding such elements together, dipping each blade element and its spacing piece element held in proper relation by the tack-welded connection or connections in a brazing bath in order that the packing piece element and the adjacent portion of the blade element may be brazed together to constitute a composite blade root, and in machining the composite blade root to provide a suitable blade fastening.

CARL R. SODERBERG.